US005424026A

United States Patent [19]

Tohbo et al.

[11] Patent Number: 5,424,026

[45] Date of Patent: Jun. 13, 1995

[54] METHOD AND APPARATUS FOR COMPRESSIVELY MOLDING CUSHIONING MATERIAL MADE FROM RECYCLED PAPER OR PULP

[75] Inventors: Masatoshi Tohbo, Nishinomiya; Shigeru Miyawaki, Amagasaki; Koichi Yoshida, Kobe; Seiichi Yonekawa, Ashiya; Kiyohisa Ueda; Katsuhiro Yamaji, both of Nara; Eiji Koyanagi, Osaka; Masahiro Takeda, Takarazuka; Hidetoshi Hirata, Kawachinagano, all of Japan

[73] Assignees: Settsu Corporation; Hitachi Zosen Corporation, both of Japan

[21] Appl. No.: 192,410

[22] Filed: Feb. 4, 1994

[30] Foreign Application Priority Data

| | | | |
|---|---|---|---|
| Mar. 18, 1993 | [JP] | Japan | 5-057569 |
| Jul. 30, 1993 | [JP] | Japan | 5-188581 |
| Jul. 30, 1993 | [JP] | Japan | 5-188582 |

[51] Int. Cl.[6] ................ B29C 43/02

[52] U.S. Cl. ................ 264/517; 264/109; 264/120; 425/80.1; 425/414

[58] Field of Search ................ 264/517, 109, 120, 83; 425/80.1, 414

[56] References Cited

U.S. PATENT DOCUMENTS

| | | | |
|---|---|---|---|
| 4,104,348 | 8/1978 | Munk et al. . | |
| 5,028,374 | 7/1991 | Imao et al. | 264/517 |
| 5,277,854 | 1/1994 | Hunt | 264/86 |
| 5,314,654 | 5/1994 | Gunderson et al. | 264/517 |

FOREIGN PATENT DOCUMENTS

| | | |
|---|---|---|
| 2082442 | 12/1971 | France . |
| 2136645 | 12/1972 | France . |
| 937015 | 12/1955 | Germany . |
| 1131866 | 6/1962 | Germany . |
| 1963367 | 7/1971 | Germany . |
| 1245692 | 9/1971 | United Kingdom . |

*Primary Examiner*—Mary Lynn Theisen

*Attorney, Agent, or Firm*—D. Peter Hochberg; Mark Kusner; Michael Jaffe

[57] ABSTRACT

The invention provides an apparatus for compressively molding cushioning material using a quadrangular cylindrical molding box having an end side closed by a receiver mold, whereas the other end of said molding box receives supply of dry raw material consisting of fiberized paper or pulp by a volume corresponding to several times the actual volume of a molded body. A compressive mold inserted from the other end of the molding box is shifted to one-end side of the molding box to compress supplied raw material between a receiver mold. Simultaneously, a core member is retreated to a predetermined position of said one-end side in association with the shifting movement of the compressive mold. As a result, the core portion having thin thickness and the interior of the core member can securely be compressed and molded with even density.

9 Claims, 8 Drawing Sheets

METHOD AND APPARATUS FOR COMPRESSIVELY MOLDING CUSHIONING MATERIAL MADE FROM RECYCLED PAPER OR PULP

FIELD OF THE INVENTION

The present invention relates to a method and an apparatus for compressively molding cushioning material. More particularly, the invention provides a method and an apparatus for molding package cushioning material capable of alleviating vibration and shock Generated on the way of transporting a packaged product or load by disposing cushioning material every corner of the product by utilizing cushioning material made from dried fiberized paper or pulp having 20 through 50% by weight of water content.

BACKGROUND OF THE INVENTION

Conventionally, majority of cushioning material used for packaging products is shared by the one made from synthetic resin such as foamed styrol or PVC for example. However, majority of used cushioning material is abandoned without being collected. After being abandoned in reclaimed land, cushioning material cannot be decomposed spontaneously. When being burnt, cushioning material generates an enormous degree of heat to incur damage to combustion facilities, thus raising critical problem.

To solve this problem and innovate cushioning material capable of replacing conventional cushioning material made from synthetic resin, molded pulp material made from recycled paper or pulp via a vacuum milling process or such a cushioning material availing of cylindrically formed paper board or compressively molded pulp material, have respectively been offered for use. In this case, solution containing about 1 to 2% by weight of fibrous recycled paper dissolved in water is dehydrated and molded into the above-cited pulp-molded cushioning material via a vacuum milling process before eventually being dried, and as a result, produced cushioning material has substantial density and hard surface enough to potentially damage coated surface of packaged product. Furthermore, according to the above art, there is a certain limit to mold cushioning material having substantial thickness, and therefore, even the cushioning material based on the above art cannot be applied to practical use requiring substantial strength.

On the other hand, the above-cited cushioning material using cylindrically formed paper board and compressively formed pulp-molded material cannot form specific cushioning material having complex shape, thus resulting in the restricted field of use.

Therefore, the object of the invention is to fully solve the above problems incidental to conventional cushioning materials by providing a novel method and a novel apparatus for compressively molding an improved cushioning material made from recycled paper or pulp featuring soft superficial touch without fear of incurring damage to packaged product, substantial strength, and substantial shock-absorptive property, and yet, perfect adaptability to complex shapes.

DISCLOSURE OF THE INVENTION

To fully solve the above problems, the invention provides a novel method of compressively molding cushioning material made from recycled paper or pulp by operating a receiver mold having closed a one-end side and a quadrangular cylindrical molding unit having a retractable core member provided in a through-hole formed in the cylindrical molding unit, wherein the molding method sequentially executes a step to feed dry raw material consisting of fiberized paper or pulp into the cylindrical molding unit from the other side by a certain volume corresponding to several times the volume of a molded body, a step to insert a compressive mold from the other side of the cylindrical molding unit, a step to shift the compressive mold to an end of the molding unit, a step to compress raw material between the compressive mold and the receiver mold, a step to retract the core member to a predetermined position at one end of the molding unit in linkage with compressive movement of the compressive mold, and a final step to compressively mold the supplied raw material into a predetermined shape by jointly operating the cylindrical molding unit, the core member, and the compressive mold.

The apparatus for compressively molding improved cushion material according to the invention comprises the following;

a receiver mold which is disposed in the quadrangular cylindrical molding unit by way of closing an end side and internally provided with a through-hole;

a core member which is retractably disposed inside of the through-hole of the receiver mold;

a compressive mold which is movably set to the other end side of the cylindrical molding unit so that it can project and retract itself;

a compressive-mold drive means which projectively move the compressive mold into the cylindrical molding unit so that the compressive mold can compressively mold raw material;

a raw material supply means which is set to the other end side of the cylindrical molding unit in order to feed raw material into the cylindrical molding unit; and a core-member retracting means which retracts the core member in linkage with movement of the compressive-mold drive means.

According to the structure described above, simultaneous with activation of the compressive mold to compress raw material, the core member shifts itself backward. This causes compressive ratio of the core member to be equalized to other components each having different thickness to yield a molded body having even density all over the body. As a result, the apparatus embodied by the invention can compressively mold an optimal cushioning material incorporating ideal shock-absorptive property and strength.

DESCRIPTION OF THE PREFERRED EMBODIMENTS

Referring now to the accompanying drawings, the compressive molding apparatus according to an embodiment of the invention is described below.

Figure 7:
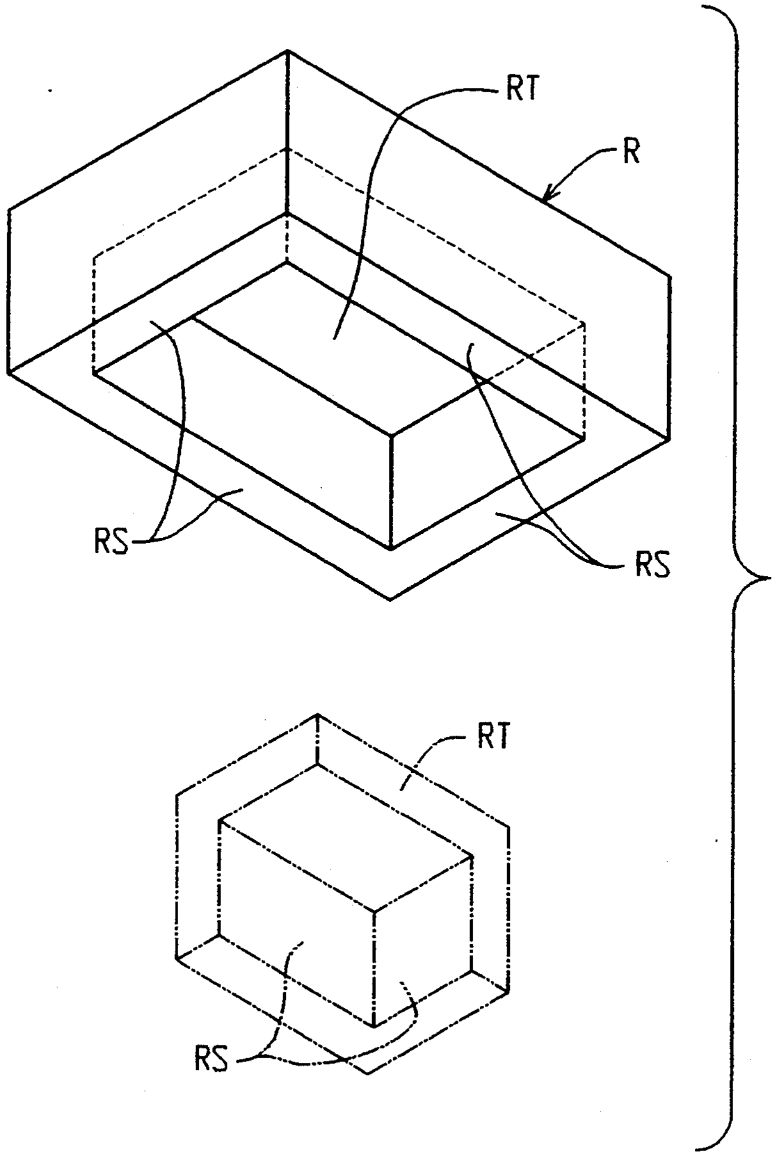
FIG. 7 is a perspective view of the molded body.

As shown in FIG. 7, using dry and fiberized recycled paper or pulp raw material M containing 20 through 50% by weight of residual water, the compressively molding apparatus according to the invention compressively molds a quardrangular box shape molded body R having bottom being opened by lateral wall domains S in four surfaces and a bottom wall domain RT. As shown in FIG. 7 with imaginary line, the molded body R is split into four parts which are subsequently used for composing cushioning material to be set to four corners of an individual package. The molded body R can also be molded into complex shapes.

Figure 1:
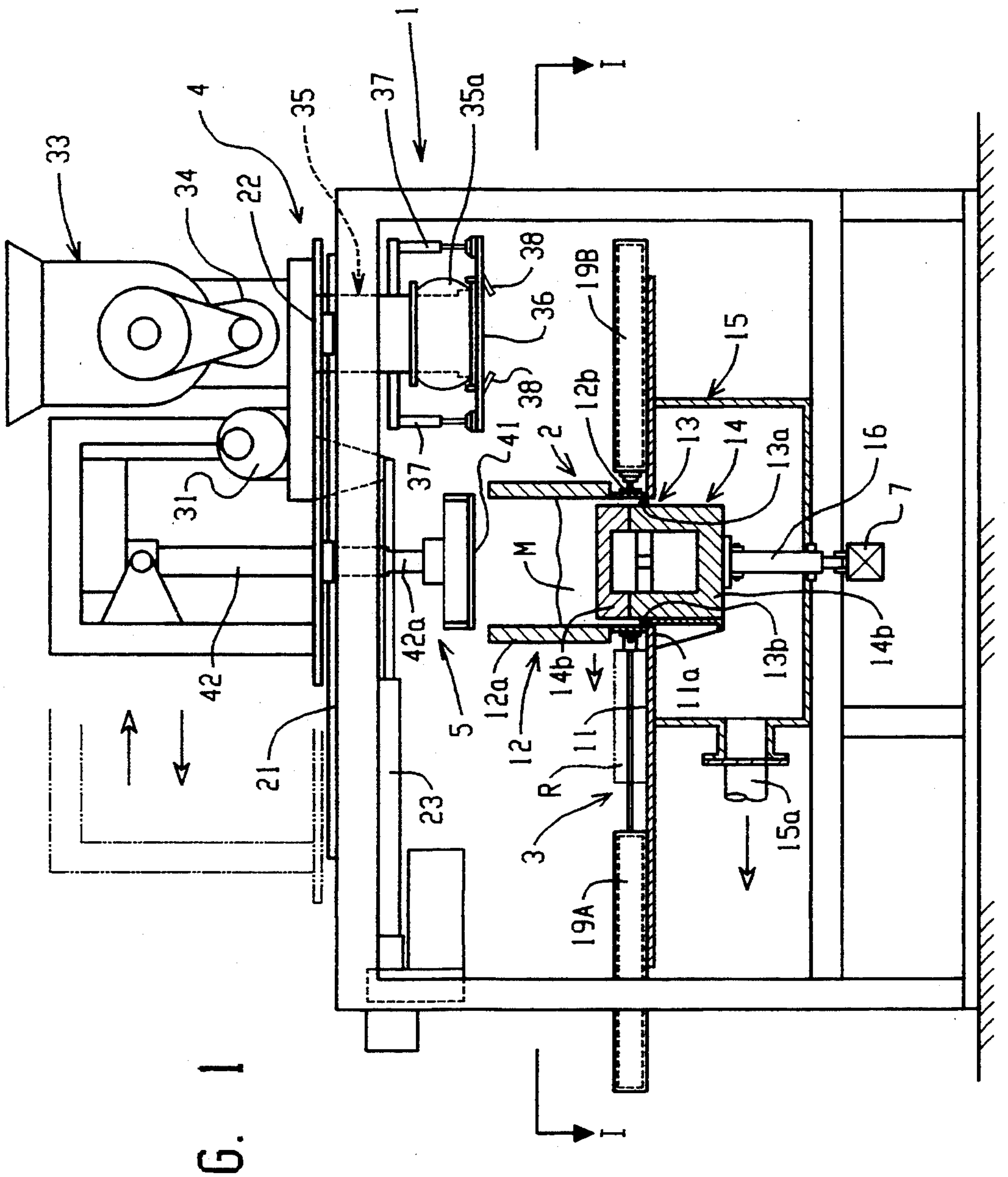
FIG. 1 is a front sectional view of an embodiment of the apparatus for compressively molding cushioning material made from recycled paper or pulp according to the invention.
Figure 2:
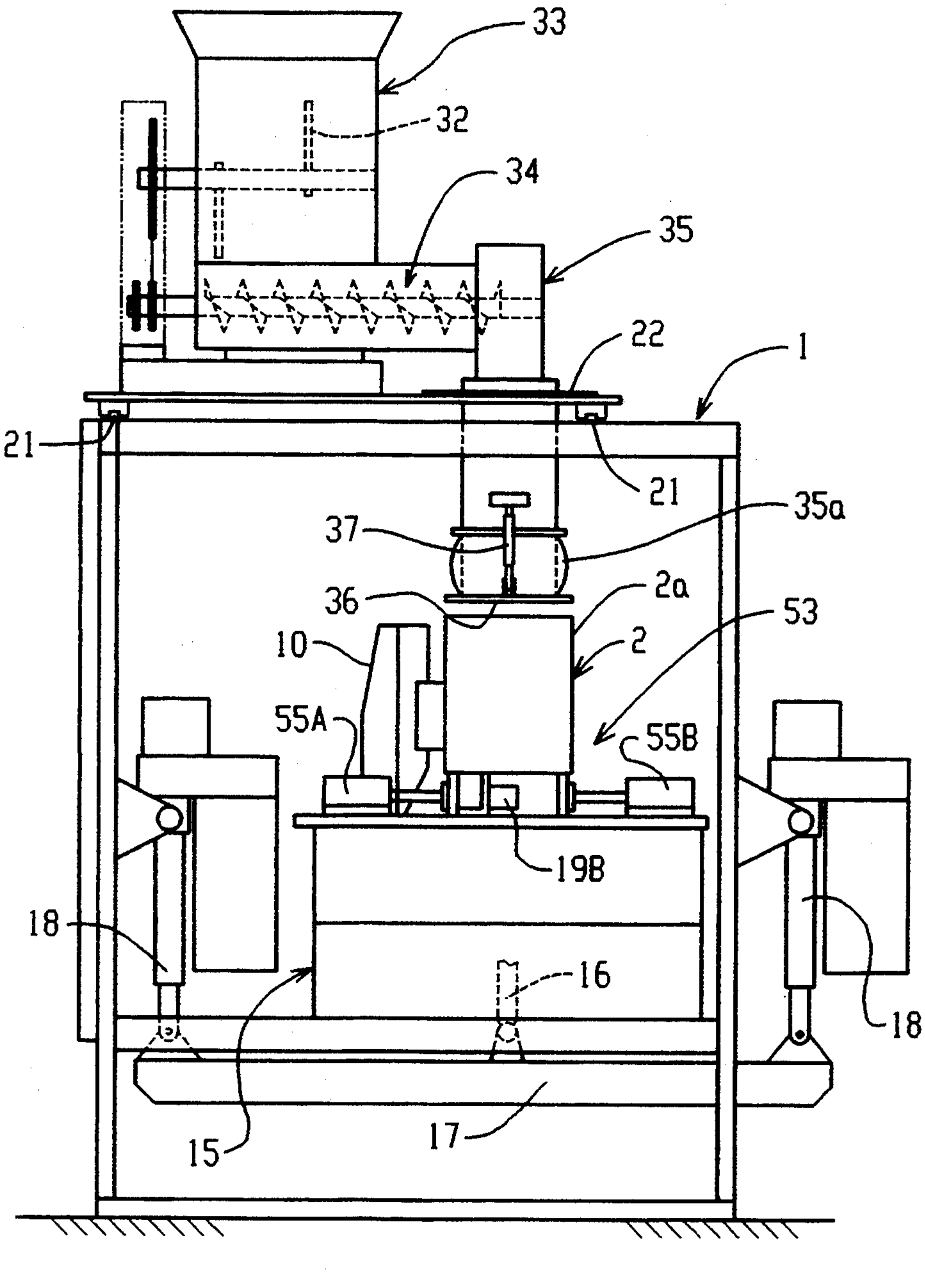
FIG. 2 is a lateral view of the apparatus shown in FIG. 1.
Figure 3:
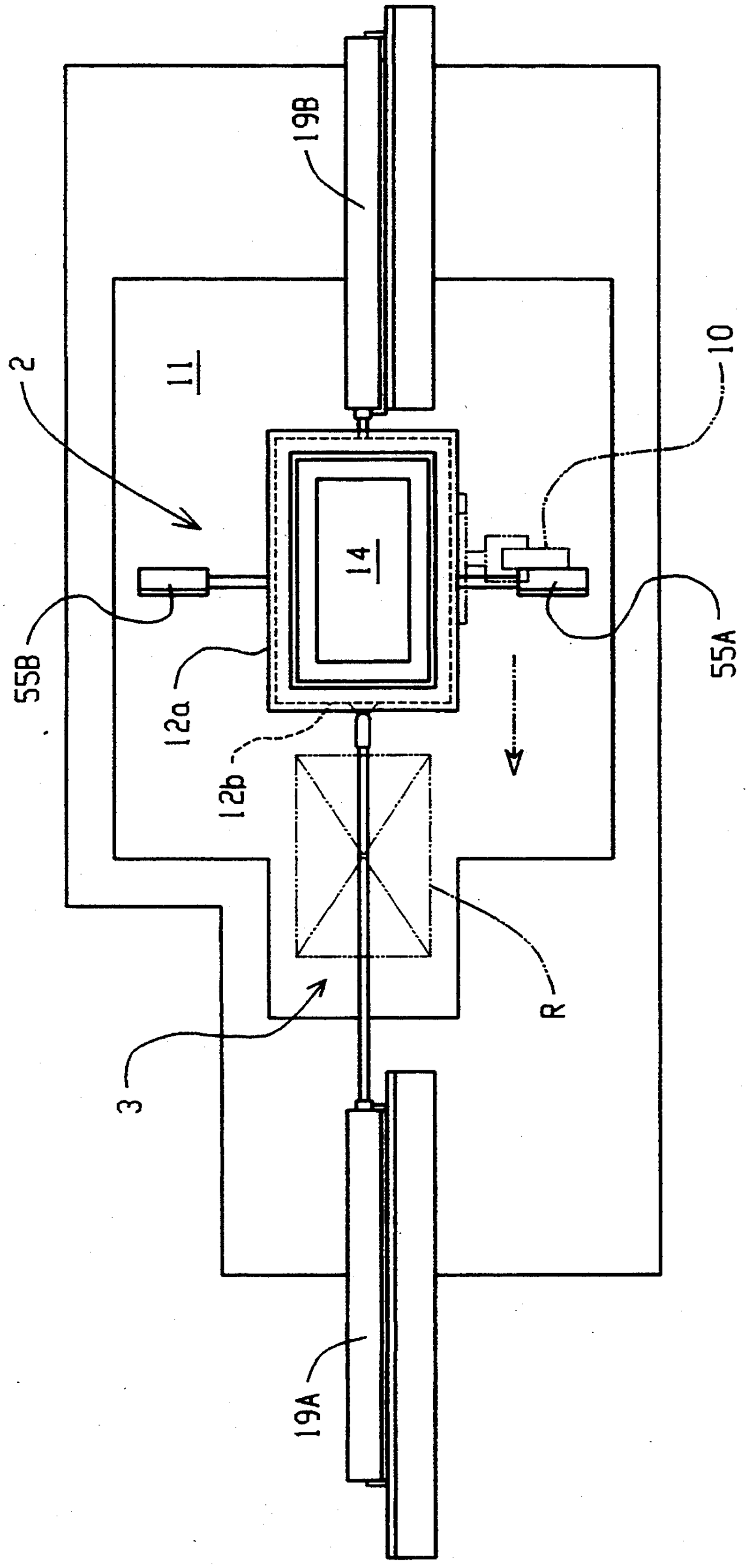
FIG. 3 is a sectional view of the apparatus along the line I—I shown in FIG. 1.

As shown in FIGS. 1 through 3, the compressive molding apparatus according to the invention comprises a quadrangular cylindrical molding unit 2, an outlet 3 for a molded body, which are disposed in the center of a mount frame 1, a raw-material supply unit 4, and a compressive-mold driver 5.

A quardrangular cylindrical molding box 12 is vertically held by a supporting member 10 mounted on a horizontal base plate 11 of the molding unit 2. A removable lower receiver mold 13 is set to aperture domain 11*a* of the horizontal base plate 11 below the molding box 12. A quadrangular through-hole 13*a* is formed in the center of the removable lower receiver mold 13. A movable core member 14 capable of ascending and descending itself is provided in the quadrangular through-hole 13*a*. In addition, a number of suction holes 13*b* are formed by way of penetrating the removable lower receiver mold 13. A vacuum vessel 15 is set to the horizontal base plate 11 by way of linkage with the interior of the molding box 12 via the suction holes 13*b*. A vacuum pump is connected to an exhaust port 15*a* of the vacuum vessel 15 via an exhaust duct. On the way of supplying raw material, air in the molding box 12 is absorbed in the vacuum vessel 15 via the suction holes 13*b* to cause raw material M supplied from the raw-material supply unit 4 to be deposited inside of the molding box 12 uniformly.

The movable core member 14 comprises a base core 14*a* and a removable core member 14*b* which is removably set to the top surface of the base core 14*a*. The removable core member 14*b* is set to the compressive molding position inside of the molded body R. The removable core member 14*b* can be drawn out together with the molded body R. Concretely, a recess 14*c* having upper open surface is formed in the base core 14*a*. The recess 14*c* is internally provided with a positioning pin 14*d* and a pin shifting cylinder 14*e* for shifting the positioning pin 14*d* in the vertical direction. On the other hand, a positioning recess 14*f* is formed on the bottom surface of the removable core 14*b* so that the positioning pin 14*d* can be inserted therein. The positioning pin 14*d* projects itself on the way of supplying raw material M and compressively molding it, and then, the positioning pin 14*d* is engaged with the positioning hole 14*f* to cause the removable core member 14*b* to be secured to the base core 14*a*. Therefore, when the pin shifting cylinder 14*e* moves to engage the pin positioning pin with the positioning hole 14*f*, the removable core 14*b* can be secured to a predetermined position of the base core 14*a* without being displaced from the secured position while the compressive molding process is underway. When the pin shifting cylinder 14*e* contracts itself, the positioning pin 14*d* is disengaged from the positioning hole 14*f* so that the molded body R can be drawn outside as of the state in which the base core 14*a* still remains being inserted in the molded body R. A through-hole 14*g* is formed in the base core 14*a* to interlink the recess 14*c* with the vacuum vessel 15. The through-hole 14*g* accommodates a fluid-supply tube for driving the pin-shifting cylinder 14*e*, and yet, facilitates absorptive fixation of the removable core 14*b*.

Through the bottom of the vacuum vessel 15, an operating rod 16 is connected to an operating frame 17 capable of moving itself back and forth, where tip end of the operating rod 16 is linked with the base core 14*a*. A pair of output rods of a pair of core retreating jacks 18 are connected to both ends of the operating frame 17. Therefore, when the core retreating jacks 18 respectively elongate and contract themselves, the movable core 14 ascends and descends via the operating rod 16.

The above-identified quadrangular molding box 12 comprises a pair of stationary molding frames 12*a* and 12*a* held by a supporting member 10 and a removable molding box 12*b* which is disposed below the stationary molding frames 12*a* and 12*a* by way of slidably shifting itself to the left and to the right orthogonal to the direction of compressively molding raw material. A compressive mold 41 for compressing raw material M in the molding box 12 is removably engaged with an output rod 42*a* of the compressive-mold driver 5. In order to externally deliver a compressed and stable molded body R as of the condition jointly being sealed by the removable molding box 12*b*, the removable lower receiver mold 13, the removable core 14*b*, and the removable upper compressive mold 41, a pair of jacks 19A and 19B are disposed on both sides of the molding box 12 on the horizontal base plate 11, where the jacks 19A and 19B jointly-draw out the molded body R by causing the removable molding box 12*b* to slide itself via cooperation with the receiver mold 13, the removable core 14*b*, and the compressive mold 41.

The raw-material supply unit 4 and the compressive mold driver 5 are respectively secured to a slidable mount 22 which is movably mounted on the mount frame 1 via a pair of guide rails 21. By operating a change-over jack 23 installed to the mount frame 1, the slidable mount 22 is shifted to the left and to the right by a predetermined stroke to shift the raw-material supply unit 4 and the compressive-mold driver 5 shown in FIG. 1 to predetermined operating positions above the molding box 12.

The raw-material supply unit 4 is furnished with a raw-material hopper 33 incorporating a stirrer 32 driven by a raw-material supply motor 31. A screw feeder driven by the motor 31 installed below the raw-material hopper 33 feeds raw material M by a predetermined volume. An elastic member 35*a* is secured to the bottom end of a raw-material supply tube 35 which is connected to outlet of the screw feeder 34. The elastic member 35*a* is furnished with a plane connective cover 36 for covering the aperture on the top surface of the molding box 12. A pair of outlet shafts of a pair of connecting cylinders 37 set to the left and to the right are respectively connected to the plane connecting cover 36 in order to move the connecting cover in vertical direction to link the molding box 12 with the raw-material supply tube 35, where the plane connecting cover 36 is provided with a plurality of pneumatic nozzles 38. On the way of supplying raw material M, those pneumatic nozzles 38 jointly blow air into the molding box 12 to stir raw material M so that the raw material M can evenly be deposited in the molding box 12.

Figure 5:
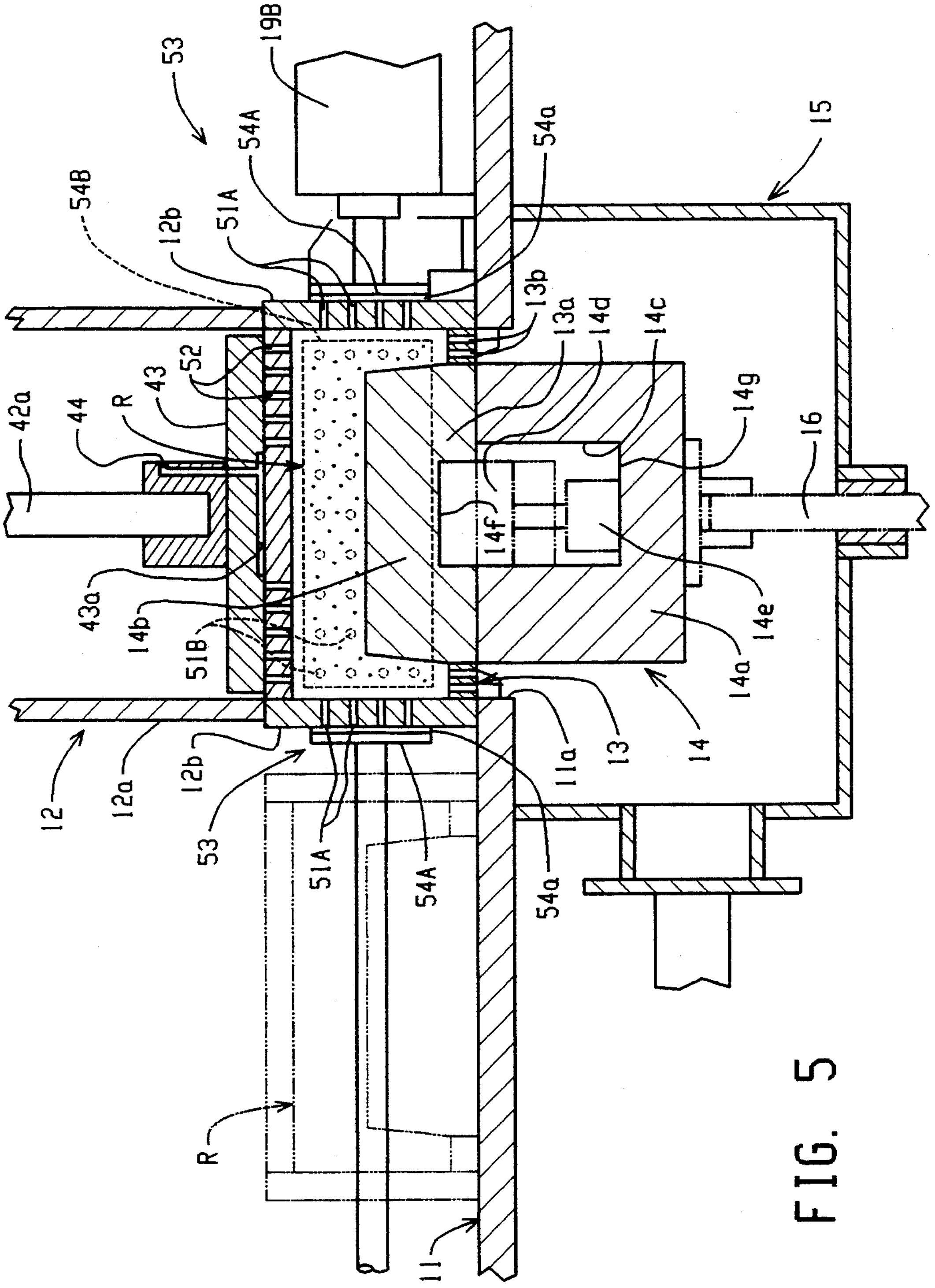
FIG. 5 is a front sectional view designating condition to compressively mold a molded body.

A compressive jack 42 serving as compressing means secured to the slidable mount 22 is vertically set to the compressive mold driver 5. As shown in FIG. 5, a drive rod 42*a* of the compressive jack 42 is provided with a suction board 43 with which the compressive mold 41 is removably engaged. An air suction hole 44 is formed by way of penetrating the suction board 43 and being linked with a suction recess 43*a* formed in the center of the bottom surface of the suction board 43. A suction hose (not shown) is connected to the suction hole 44.

Figure 6:
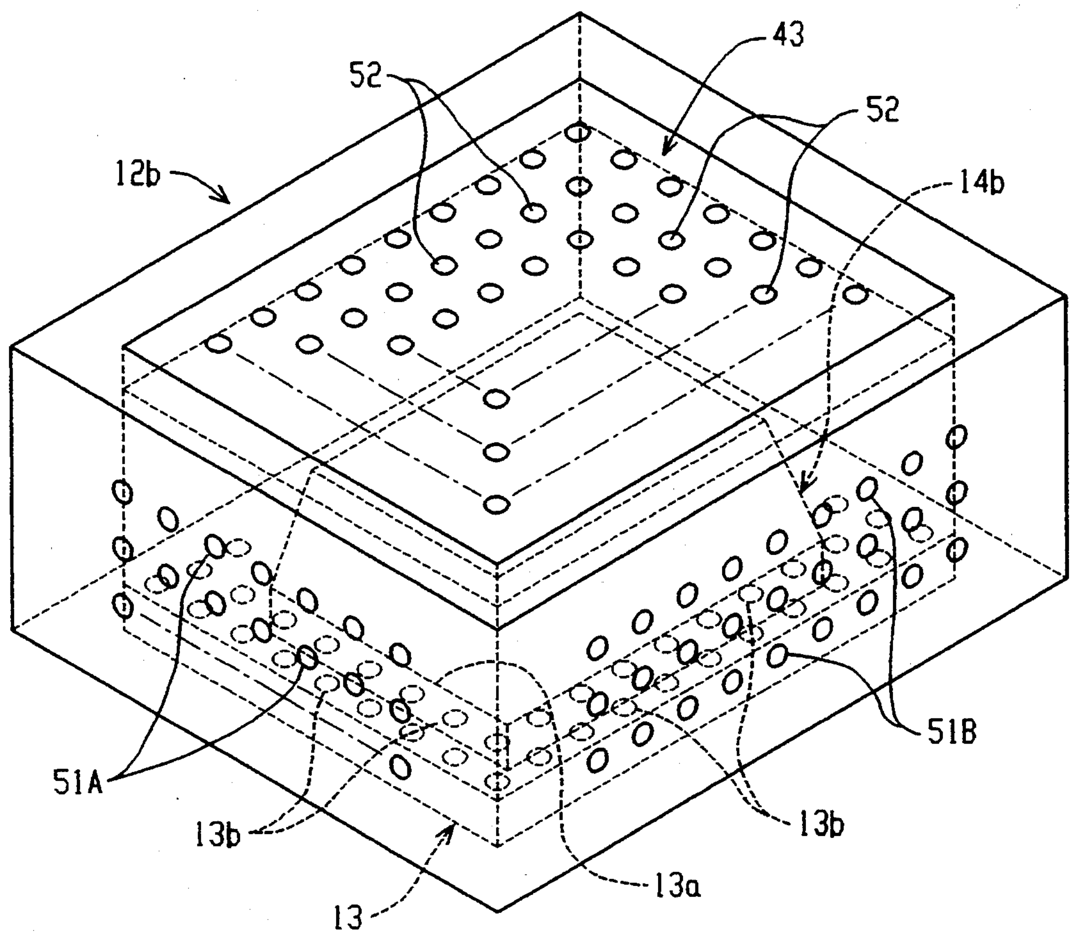
FIG. 6 is a perspective view designating the state of discharging the molded body with a molding box.

While operating the compressive molding apparatus embodied by the invention, the compressively molded body R is externally drawn as of the condition being sealed by the removable molding box 12, the removable lower receiver mold 13, the removable core 14*b*, and the removable upper compressive mold 41, and then, the molded body R is directly transferred into a drying unit for drying it. As shown in FIGS. 5 and 6, in order to evenly dehydrate water contained in the molded body R via a drying process, a number of fine-diametric through-holes 51A and 51B, 13*b* (concurrently with suction holes), and 52, are formed in the removable molding box 12*b*, the removable lower receiver mold 13, and the removable upper compressive mold 41. In the course of feeding raw material M, the raw material M is evenly distributed inside of the molding box 12, and therefore, stirring air blown off from plural pneumatic nozzles 38 into the molding box 12 is absorbed into the vacuum vessel 15 via the suction hole 13*b* of the removable lower receiver mold 13, thus generating vertical-directional air flow inside of the molding box 12. If the fine-diametric through-holes 51A and 51B formed in the removable molding box 12*b* remain open in presence of the above condition, then, the vertical air flow will be disturbed to adversely influence the effect of uniformly deposited raw material M. To prevent this, a sealing system 53 is provided in order to shut off those fine through holes 51A and 51B of the removable molding box 12 in the course of feeding raw material M and on the way of compressively molding it into a predetermined shape.

More particularly, the sealing system 53 comprises a pair of sealing plates 54A and 54B which are respectively adhered with soft-rubber sealing material 54A and a plurality of pressurizing cylinders 55A, 55B, 19A, and 19B, which respectively pressurize the sealing plates 54A and 54B against external surface of the removable molding box 12*b*. The pressurizing cylinders 55A and 55B are respectively disposed in the front and on the back of the molding box 12 mounted on the horizontal base plate 11, where the pressurizing cylinders 55A and 55B respectively shut off the fine through-holes 51B which are available for drying the molded body R and disposed on the front and back surfaces of the removable molding box 12*b*. The above-identified jacks 19A and 19B available for drawing out the molded body R concurrently serve themselves as horizontal-direction pressurizing cylinders for shutting off the fine through-holes 51A for drying use on the left and right surfaces of the removable molding box 12*b*. As shown in FIG. 5, those fine through-holes 52 for drying use formed on the removable upper compressive mold 41 respectively remain being closed by the suction plate 43 while a compressive molding process is underway.

After externally being delivered, the molded body R is tightly bound by a binding unit (not shown) at the extracted position. This in turn enables the molded body R to preserve own shape before being conveyed to a drying unit.

Referring now to FIGS. 4 and 5, the method of compressively molding cushioning material using recycled paper or pulp according to an embodiment of the invention is described below.

(1) Initially, a stationary molding box 12*a* is lifted along a supporting member 10, and simultaneously, a base core member 14*a* is lowered to a predetermined compressive molding position. While this condition remains, a removable lower receiver mold 13, a removable core member 14*b*, and a removable molding box 12*b*, are respectively positioned. Next, a pin-shifting cylinder 14*e* elongates itself to cause a positioning pin 14*d* to be inserted in a pin-positioning hole 14*f*, and then, the removable core member 14*b* is positioned before being secured to a base core member 14*a*.

(2) Next, the stationary molding box 12*a* is lowered to be connected to the removable molding box 12*b*. Then, a pair of jacks 19A and 19B available for externally drawing a molded body R and a pair of pressurizing cylinders 55A and 55B respectively elongate themselves to cause a pair of sealing plates 54A and 54B to come into contact with lateral surface surface of the removable molding box 12*b* so that fine through-holes 51A and 51B for drying use can respectively be shut off. Simultaneously, a change-over jack 23 contracts itself to cause a raw-material supply unit 4 to halt itself right above the molding unit 2. Next, a connecting cylinder 37 elongates itself to cause a connecting cover 36 to be pressed against an aperture on the top surface of the molding box unit 12 so that a raw-material supply tube 35 can be linked with the molding box unit 12.

(3) In the third step, a raw-material feeding motor 31 drives a screw feeder 34 to initiate supply of a specific amount of raw material M from a raw-material hopper 33 previously storing raw material M by a predetermined amount corresponding to a single piece of the molded body R, and then, a specific amount of raw material M is delivered to the internal space of the molding box unit 12 via the raw-material supply tube 35. While this operation proceeds, the interior of a vacuum vessel 15 is filled with negative pressure to cause air in the molding box unit 12 to be absorbed via a suction hole 13*b* to generate vertical-directional air flow inside of the molding box unit 12, thus effectively preventing supplied raw material M from being deposited on the inlet side. At the same time, a number of pneumatic nozzles 38 respectively blow off stirring air into the molding box unit 12 to evenly disperse the internally deposited raw material M. In consequence, the whole space of the molding box unit 12 is evenly filled with raw material M from the bosom of a sidewall RS. (See FIG. 4*a*)

Figure 4B:
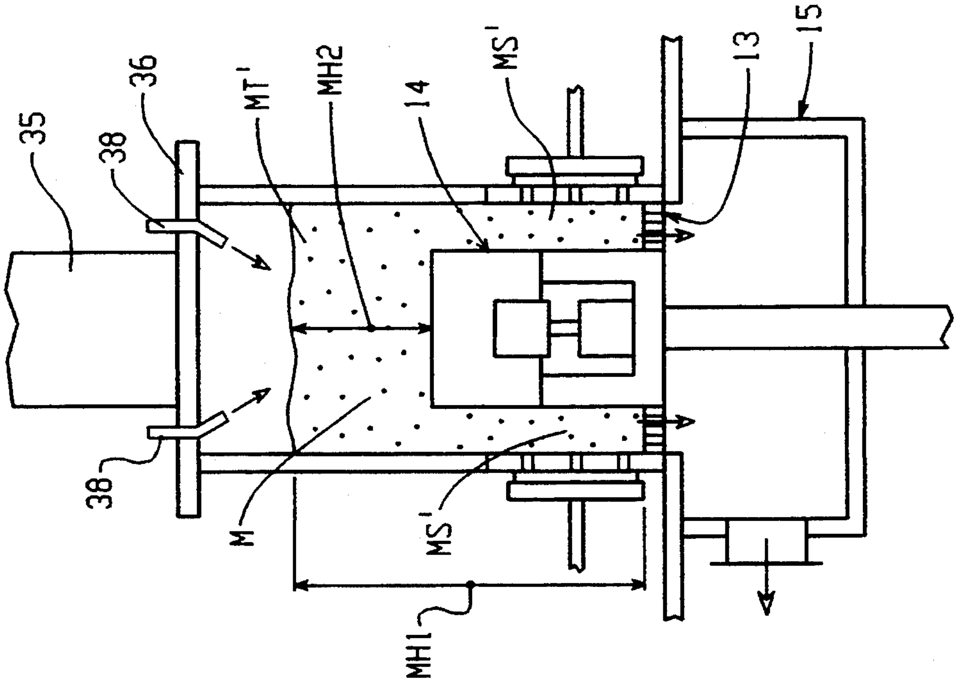
FIG. 4 designates the molding unit of the compressive molding apparatus, wherein (*a*) through (*d*) are respectively explanatory of the molding operation.
Figure 4A:
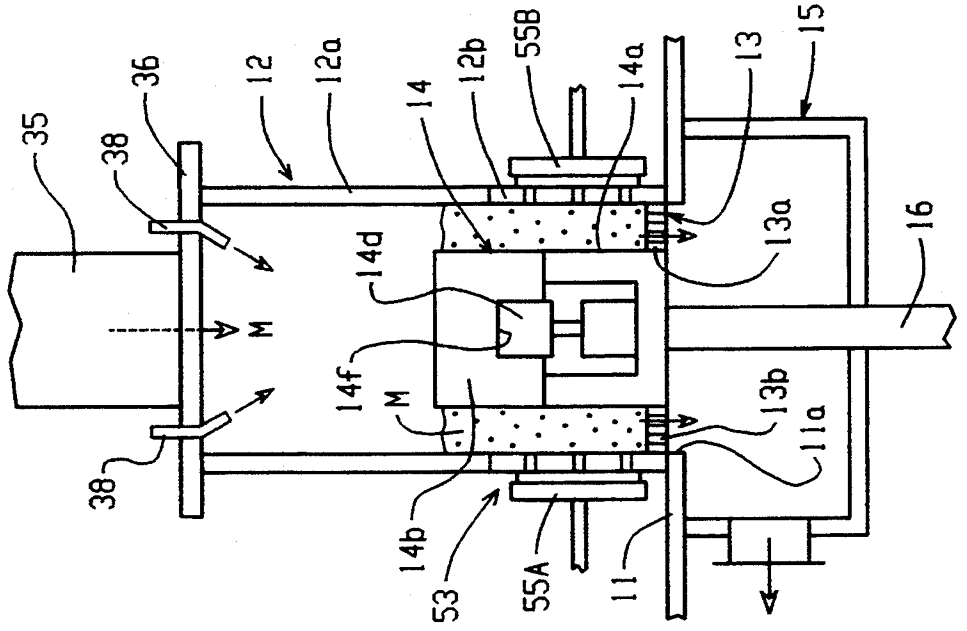

(4) When the whole lot of raw material M is out from the hopper 33, the raw-material supply motor 31 suspends own rotation. While this condition is entered, as shown in FIG. 4*b*, actual amount of supplied raw material M reaches N times corresponding to 2 through 6 times the actual volume of the molded body R. Assume that density of raw material M deposited on lateral-wall molded portion RS' without insertion of a movable core 14 substantially coincides with density of raw material M deposited on bottom-wall molded portion RT' with the inserted movable core 14, then, height MH1 of raw material M deposited on the lateral-wall molded portion RS' corresponds to height RH1×N of the lateral-wall portion of the molded body R. The molding apparatus embodied by the invention can properly arrange chargeable amount of raw material M and position of the movable core 14 in order that thickness of raw material MH2 of the bottom-wall portion RT' can exactly correspond to thickness RH2×N of the bottom-wall portion RT' of the molded body R.

(5) After lifting a connecting cover 36 by operating a connecting cylinder 37, the change-over jack 23 proceeds to cause a compressive-mold driver 5 to halt itself right above the molding box unit 2. Next, a compressive jack 42 proceeds to cause a removable upper compressive mold 41 to be inserted in the molding box unit 12. The compressive jack 42 further proceeds to cause the removable upper compressive mold 41 to descend itself at a predetermined lowering speed in order to compress raw material M. In association with these processes, a core-retreating jack 18 proceeds to cause the movable core 14 to descend itself at a speed corresponding to or slightly lower than the descending speed of the removable upper compressive mold 41. As a result, the lateral-wall portion RS and the bottom-wall portion RT of the molded body R are compressed and homogenized at a substantially equal speed and ratio without causing specific domain to be compressed too densely in the initial stage. See FIG. 4*c*.

Figure 4D:
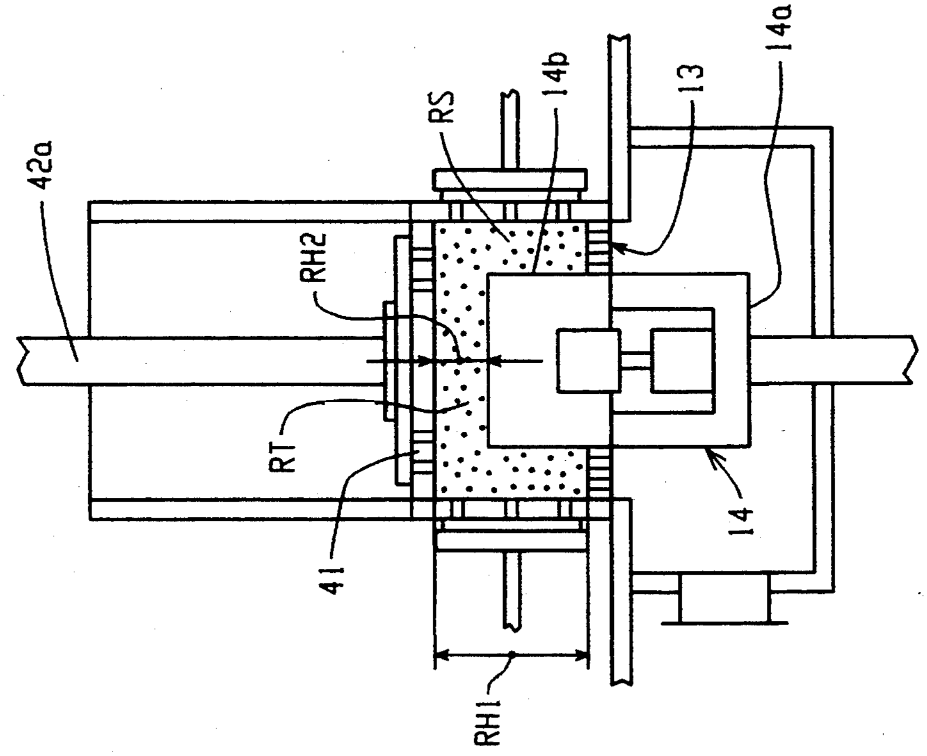
Figure 4C:
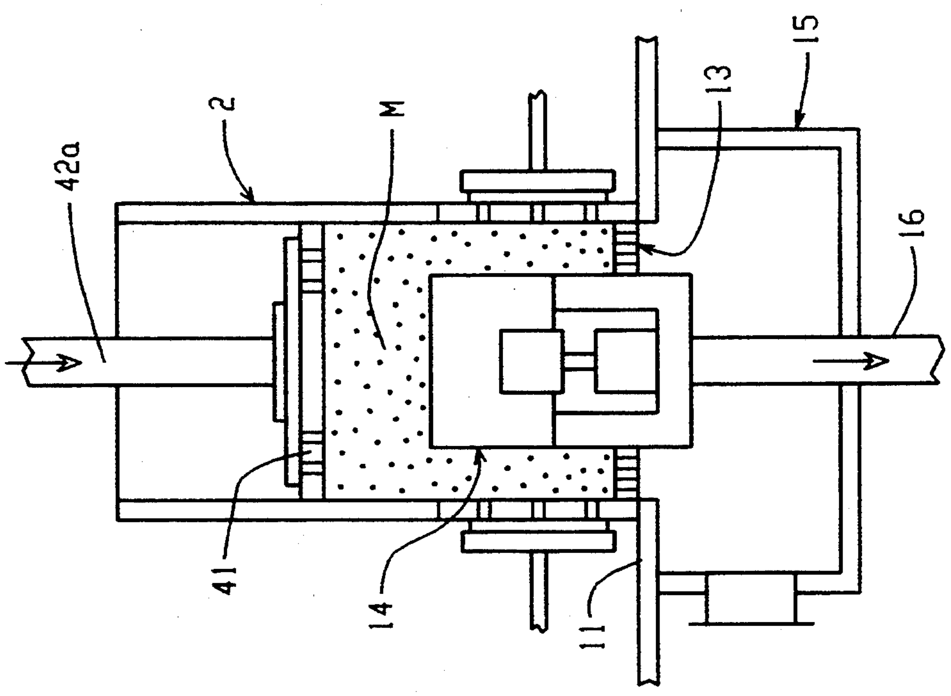

(6) As shown in FIG. 4*d*, the removable upper compressive mold 41 and the movable core 14 are respectively lowered to predetermined positions to complete a molding process at the halted position. Then, the pin-shifting cylinder 14*e* contracts itself to disengage the positioning pin 14*d* from the positioning hole 14*f*. As a result, the removable core 14*b* of the movable core 14 leaves the base core 14*a*. At the same time, the pressurizing cylinders 55A and 55B respectively contract themselves to cause a sealing plate 54B to leave the removable molding box 12*b*. Next, an absorptive air hole 44 is freed from negative pressure to permit the removable upper compressive mold 41 to be disengaged from an absorptive plate 43 to cause a molded-body extracting jack 19A to contract itself. Simultaneously, the other extracting jack 19B proceeds to slidably shift the molded body R in cooperation with the removable molding box 12*b*, the removable lower receiver mold 13, the removable core 14*b*, and the removable upper compressive mold 41, over the horizontal base plate 11 to the left of FIG. 1 before eventually displacing the molded body R from the compressive molding apparatus (See FIG. 5). Next, the removable molding box 12*b*, the removable lower receiver mold 13, the removable core 14*b*, and the removable upper compressive mold 41, are respectively bound by a belt means in order that the molded body R can be prevented from restoring expansible property. Then, the molded body R is dried in a dryer unit. In consequence, about 30% by weight of water contained in raw material M of the molded body R is decreased to about 10% by weight, thus completing solid molded body R free of stability. In the final stage, the removable molding box 12, the removable lower receiver mold 13, the removable core 14*b*, and the removable upper compressive mold 41, are respectively disengaged from the molded body R.

When operating the invented molding system featuring the above structure, raw material M consists of fiberized dry paper or pulp containing 20% through 50% by weight of water. Raw material M substantially comprises fluffy soft-cotton-like material having apparent specific gravity rated to be in a range from 0.04 to 0.07 grams per cubic centimeter, where the raw material M is devoid of fluidity and apt to become pills when being treated with mechanical force, and thus, it cannot easily be filled in a molding apparatus with evenness. Nevertheless, when executing the method embodied by the invention, on the way of supplying raw material, air inside of the molding box 12 is sucked via the suction hole 13*b* of the removable lower receiver mold 13. In addition, stirring air is jetted into the removable molding box 12 from the pneumatic nozzles 38. By virtue of the air-flowing system, raw material M can evenly be deposited on the lateral-wall portion RS and the bottom-wall portion RT with substantially even density despite of their height being different from each other. In the event that difference occurs in the density of raw material M deposited on the lateral-wall portion RS and the bottom-wall portion RT, the difference of density can easily be solved merely by arranging strokes of the movable core 14.

In order to provide every local domain having different thickness with specific volume substantially being equal to each other in a range 2 through 6 times the actual volume of the molded body R, the method and the apparatus embodied by the invention evenly deposits its raw material M. Since the apparatus embodied by the invention causes the movable core 14 to retreat itself simultaneous with downward compressive movement of the removable upper compressive mold 41, the lateral-wall portion RS and the bottom-wall portion RT having different thickness are compressed at a substantially identical speed ratio and compressive ratio, thus making it possible for the apparatus embodied by the invention to produce a quality molded body R having even and optimal density ranging from 0.20 through 0.25 gram per cubic centimeter. In consequence, the molding apparatus according to the invention can securely produce quality cushioning material having soft superficial touch without fear of damaging the packaged product and substantial strength free of incurring damage at all by effectively alleviating external shock.

Since the molding apparatus according to the invention draws out the molded body R together with the removable molding box 12*b*, the removable lower receiver mold 13, the removable core 14*b*, and the removable upper compressive mold 41, which respectively cover external surface of the molded body R, the system can readily perform ensuing processes for molding the following molded body R merely by mounting a new removable molding box 12*b*, a new removable lower receiver mold 13, a new removable core 14*b*, and a new removable upper compressive mold 41, thus making it possible for the invented system to constantly yield satisfactory operative efficiency and productivity. In particular, since the removable core 14*b* is engageable and disengageable by the positioning pin 14*d* provided inside of the base core 12*a*, the removable core 14*b* can precisely be mounted in position on the way of supplying raw material and in the course of executing a compressive molding operation without fear of being displaced from the predetermined position, and yet, the removable core 14*b* can readily be mounted and removed.

The molded body R is subject to a drying process as of the state being extracted from the molding apparatus together with the removable molding box 12, the removable lower receiver mold 13, the removable core 14*b*, and the removable upper compressive mold 41. When being dried, owing to effective function of the fine through-holes 51A and 51B formed in the removable molding box 12, the suction hole 13*a* formed in the removable lower receiver mold 13, and the fine through-holes 53 formed in the removable upper compressive mold 41, water contained in the molded body R is evenly evaporated, thus making it possible for the apparatus embodied by the invention to constantly yield homogeneously molded body R.

What is claimed is:

1. A method of compressively molding cushioning material made from recycled paper or pulp by operating a receiver mold having a closed one end and a quadrangular cylindrical molding box having a retractable core penetrating a through-hole formed in said receiver mold, wherein said method comprises the sequential steps that follow;

a step to feed dry raw material consisting of fiberized waste paper or pulp to inner space of said molding box from the other end by a volume corresponding to plural times the volume of a molded body;

a step to insert a compressive mold from the other end of said molding box;

a step to shift said compressive mold to one side to compress said raw material between said compressive mold and said receiver mold;

a step to cause said core to retreat itself to a predetermined position at one end of said molding box in linkage with compressive movement of said compressive mold; and a final step to compressively mold said raw material by means of said molding box, said core, and said compressive mold.

2. The method of compressively molding cushioning material made from waste paper or pulp as set forth in claim 1, further comprising the sequential steps that follow;

a step to blow stirring air into said molding box from the other end of said molding box in the course of feeding raw material into said molding box; and a step to simultaneously absorb air in said molding box via plural suction holes formed on one side of said molding box.

3. An apparatus for compressively molding cushioning material made from waste paper or pulp comprising;

a receiver mold which is set to a quadrangular cylindrical molding box by way of closing one-end side and internally provided with a through-hole;

a core member which is disposed in said through-hole of said receiver mold by way of moving itself back and forth;

a compressive mold which is set to the other end side of said cylindrical molding box by way of moving itself back and forth;

a compressive-mold drive means which causes said compressive mold to movably protrude itself into said cylindrical molding box in order to compress supplied raw material;

a raw material supply means for supplying raw material into said molding box, wherein said supply means is set to the other end side of said molding box; and a core retreating means for causing said core member to retreat itself in linkage with said compressive-mold drive means.

4. The apparatus for compressively molding cushioning material made from waste paper or pulp as set forth in claim 3, further comprising;

a plurality of pneumatic nozzles which respectively blow stirring air into said molding box from the other side of said molding box in the course of supplying raw material thereto;

a number of suction holes which respectively penetrate said receiver mold; and a vacuum vessel which absorbs air of said molding box via said plural suction holes in the course of supplying raw material.

5. The apparatus for compressively molding cushioning material made from waste paper or pulp as set forth in claim 3, further comprising;

a removable mold box which is disengageably set to a compressive molding domain at one-end side of said cylindrical molding box;

a compressive mold which is disengageably set to said compressive-mold drive means; wherein said core member comprises a base core connected to said core-retreating means and a removable core which is engageable with and disengageable from said base core by way of being positioned inside of said removable mold box while a compressive molding process is underway;

wherein said removable mold box, said compressive mold, said receiver mold, and said removable core, jointly sealing a compressively molded body, are slidably movable in the direction orthogonal to the raw-material compressing direction.

6. The apparatus for compressively molding cushioning material made from waste paper or pulp as set forth in claim 5, further comprising a positioning member which is provided inside of said base core by way of being movable back and forth by a pin-shifting means and a positioning recess formed inside of said removable core to permit insertion of said positioning member therein.

7. The apparatus for compressively molding cushioning material made from waste paper or pulp as set forth in claim 5, further comprising a number of externally connected fine-diametric through-holes available for drying raw material, wherein said fine through-holes are formed in said removable molding box, said compressive mold, and said receiver mold.

8. The apparatus for compressively molding cushioning material made from waste paper or pulp as set forth in claim 7, further comprising a sealing device for shutting off said fine through-holes formed in said removable molding box at least on the way of supplying raw material.

9. The apparatus for compressively molding cushioning material made from waste paper or pulp as set forth in claim 4, further comprising;

a removable mold box which is disengageably set to a compressive molding domain at one-end side of said cylindrical molding box;

a compressive mold which is disengageably set to said compressive-mold drive means; wherein said core member comprises a base core connected to said core-retreating means and a removable core which is engageable with and disengageable from said base core by way of being positioned inside of said removable mold box while a compressive molding process is underway;

wherein said removable mold box, said compressive mold, said receiver mold, and said removable core, jointly sealing a compressively molded body, are slidably movable in the direction orthogonal to the raw-material compressing direction.

* * * * *